United States Patent
Yi et al.

(10) Patent No.: US 10,374,761 B2
(45) Date of Patent: *Aug. 6, 2019

(54) SYSTEM AND METHOD FOR DETECTING ACTIVE RESOURCE UNITS

(71) Applicant: Huawei Technologies Co., Ltd., Shenzhen (CN)

(72) Inventors: Zhihang Yi, Ottawa (CA); Hosein Nikopour, San Jose, CA (US); Alireza Bayesteh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

This patent is subject to a terminal disclaimer.

(21) Appl. No.: 15/655,362

(22) Filed: Jul. 20, 2017

(65) Prior Publication Data
US 2017/0317799 A1 Nov. 2, 2017

Related U.S. Application Data

(63) Continuation of application No. 14/528,911, filed on Oct. 30, 2014, now Pat. No. 9,735,931.

(51) Int. Cl.
*H04W 24/08* (2009.01)
*H04L 5/00* (2006.01)
*H04L 27/00* (2006.01)

(52) U.S. Cl.
CPC ........ *H04L 5/0016* (2013.01); *H04L 27/0006* (2013.01); *H04L 5/0048* (2013.01)

(58) Field of Classification Search
CPC ............. H04W 74/0808; H04W 24/08; H04W 84/042; H04L 5/0016; H04L 27/0006
See application file for complete search history.

(56) References Cited

U.S. PATENT DOCUMENTS

| | | | |
|---|---|---|---|
| 6,259,724 B1 | 7/2001 | Esmailzadeh | |
| 9,735,931 B2 * | 8/2017 | Yi .......................... | H04L 5/0016 |
| 2006/0160539 A1 | 7/2006 | Juan et al. | |
| 2010/0074358 A1 | 3/2010 | Khojastepour et al. | |
| 2011/0044181 A1 | 2/2011 | Suo et al. | |
| 2011/0255514 A1* | 10/2011 | Olofsson ........... | H04W 72/0426 370/331 |
| 2011/0274040 A1 | 11/2011 | Pani et al. | |
| 2012/0201320 A1 | 8/2012 | Koike-Akino | |
| 2014/0140360 A1 | 5/2014 | Nikopour et al. | |
| 2014/0169412 A1 | 6/2014 | Baligh et al. | |

(Continued)

OTHER PUBLICATIONS

Bayesteh, et al., "Blind Detection of SCMA for Uplink Grant-Free Multiple-Access," 2014 11th International Symposium on Wireless Communications Systems IEEE, Aug. 26, 2014, 5 pages.

(Continued)

*Primary Examiner* — Wei Zhao
(74) *Attorney, Agent, or Firm* — Slater Matsil, LLP

(57) ABSTRACT

Disclosed herein are an active resource unit detector and a method of use thereof. An embodiment method of detecting active resource units among a plurality of potential resource units includes receiving an aggregate signal containing active pilots transmitted over the active resource units via random access transmissions. The active pilots are then detected and respectively associated with the active resource units according to a pilot-to-resource unit mapping.

26 Claims, 6 Drawing Sheets

(56) References Cited

U.S. PATENT DOCUMENTS

2014/0245086 A1 8/2014 Zaytsev et al.
2015/0304090 A1* 10/2015 Ko .................. H04B 7/024
　　　　　　　　　　　　　　　　　　　　370/329

OTHER PUBLICATIONS

Dempster et al., "Maximum Likelihood from Incomplete Data via the EM algorithm," Journal of the Royal Statistical Society. Series B (Methodological), vol. 39, No. 1, (no month, 1977), pp. 1-38.
Gorodnitsky et al., "Sparse Signal Reconstruction from Limited Data Using FOCUSS: A Re-weighted Minimum Norm Algorithm," IEEE Transactions on Signal Processing, vol. 45, No. 3, (Mar. 1997) pp. 600-616.

* cited by examiner

SYSTEM AND METHOD FOR DETECTING ACTIVE RESOURCE UNITS

CROSS-REFERENCE TO RELATED APPLICATIONS

This application is a continuation of U.S. patent application Ser. No. 14/528,911, filed on Oct. 30, 2014, which application is hereby incorporated herein by reference.

TECHNICAL FIELD

The present invention relates generally to a system and method for detecting active resource units and, in particular embodiments, to an active resource unit detector and a method of detecting active resource units among potential resource units in a random access transmission system.

BACKGROUND

Random access transmissions can reduce signaling overhead and the transmission delay for up-link (UL) access. With random access transmissions, UL communication is unscheduled, making it more efficient due to elimination of scheduling requests sent to a base station for UL communication.

Sparse code multiple access (SCMA) and low-density signature (LDS) are two multiple-access techniques that may be used in random access transmissions. LDS is a version of code division multiple access (CDMA), which is a channel access method that allows several transmitters, e.g., users, to share a radio channel by applying a spreading code, or spreading signature, to modulate each transmitter's signal. LDS uses a low-density spread code to spread quadrature amplitude modulated (QAM) symbols in the time and frequency domains. SCMA enhances LDS and CDMA by introducing a codebook-based multi-dimensional spreading encoder rather than using a spreading signature.

SUMMARY

Embodiments of the present invention provide an active resource unit detector and a method of detecting active resource units among a plurality of potential resource units in a random access transmission system.

An embodiment method of detecting active resource units among a plurality of potential resource units includes receiving an aggregate signal containing active pilots transmitted over the active resource units via random access transmissions. The active pilots from the received aggregate signal are then detected and respectively associated with the active resource units according to a pilot-to-resource unit mapping.

An embodiment active resource unit detector includes a memory and a pilot detector. The memory is configured to store a plurality of potential pilots. The plurality of potential pilots respectively corresponds to at least one potential resource unit of a plurality of potential resource units. The pilot detector includes a processor coupled to the memory. The processor is configured to receive an aggregate signal over a plurality of active resource units among the plurality of potential resource units. The aggregate signal contains active pilots for respective random access transmissions. The active pilots are a subset of the plurality of potential pilots. The processor is further configured to respectively associate the active pilots to at least one corresponding active resource unit of the plurality of active resource units.

An embodiment receiver for random access transmissions includes a memory and a processor coupled to the memory. The memory is configured to store a plurality of potential pilots, a pilot list, and a resource unit list. The plurality of potential pilots respectively corresponds to at least on resource unit of a plurality of potential resource units. The pilot list contains potentially active pilots. The pilot list is a subset of the plurality of potential pilots. The resource unit list contains potentially active resource units. The resource unit list is a subset of the plurality of potential resource units. The processor is configured to receive an aggregate signal containing a sum of active pilot signals. The processor detects the active pilot signals from the received aggregate signal. The processor then matches the active pilot signals with the potentially active pilots in the pilot list. The processor is further configured to associate the potentially active pilots with a narrowed set of respectively corresponding resource units to identify the potentially active resource units. The processor then estimates channels corresponding to the potentially active resource units. The processor is further configured to use the respective corresponding channel estimations and the potentially active resource units to receive and decode the aggregate signal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
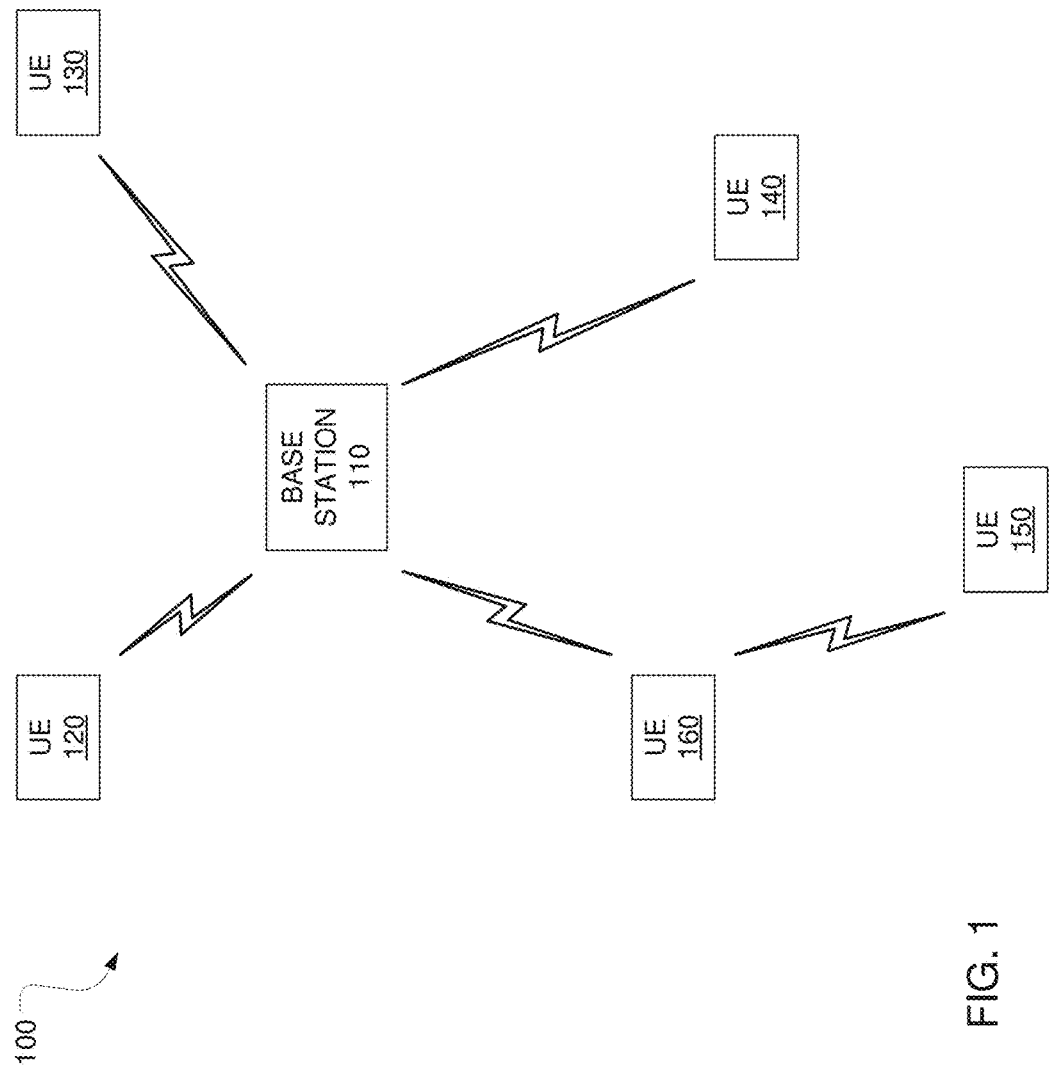
FIG. 1 is a block diagram of a wireless communication system.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

Random access transmissions can be used in UL transmissions for fifth-generation (5G) cellular systems and long term evolution (LTE) cellular systems, and ad-hoc random access systems, among other uses for random access channels. For example, in UL cellular random access systems, one or more base stations (BSs) serve multiple transmit devices. A transmit device is a user equipment (UE) in a cellular network, and is a node in an ad-hoc random access system. With random access UL transmissions, UL communication is random with respect to BS. The BS can serve many users, or UEs, but has no knowledge of which user will transmit nor when. At a given point in time, the BS receives UL signals only from active UEs in a group of many potential UEs. Therefore, the BS detects which of the potential UEs is active, which is referred to as blind active UE detection.

The potential transmit devices are allocated time and frequency resources. Within a block of time and frequency resources are resource units. A resource unit is an allocation of time frequency, and possibly a spreading code. A pilot is a sequence of symbols transmitted by a transmit device for estimating channels. One example of a pilot is a UL demodulated reference signal (DMRS) in a random access cellular system. In general, pilot sequences may be fully or partially overlapped in the time-frequency domain. In certain random access systems, a resource unit is also allocated a spreading signature (as in LDS and CDMA) or a codebook (as in SCMA). These dimensions generally allow the potential transmit devices to make random access transmissions without collision. Collisions occur when two or more transmit devices transmit at the same time, over the same frequency, with the same pilot.

The receiver generally has knowledge of all potential resource units and all potential pilots. In some random access systems, pilots are uniquely allocated to resource units or to transmit devices; which is referred to as a one-to-one or many-to-one pilot-to-transmit device mapping. When the pilot-to-transmit device mapping is one-to-one or many-to-one, it is realized herein, active pilot detection is equivalent to active transmit device detection. When the receiver has no knowledge or incomplete knowledge of pilot-to-transmit device mappings, active pilot detection is effectively active resource unit detection. When the pilot-to-transmit device mapping is one-to-many, it is also realized herein, active pilot detection can generally only identify a group or list of active resource units or active transmit devices. In random access systems using LDS, signature decorrelation helps narrow the group or list of active resource units or active transmit devices by detecting active signatures, which are often allocated to multiple resource units or multiple transmit devices.

In certain random access systems, the allocations are made in advance and receivers have knowledge of the allocations, allowing a mapping of transmit devices to resource units. In other random access systems, the allocations are made dynamically and receivers have no knowledge of the allocations. When allocations are made dynamically, receivers cannot associate a resource unit to a transmit device by the pilot alone; additional information is used to further distinguish transmit devices.

Active resource unit detection in random access transmission systems can be accomplished in various ways. For example, when LDS is used in random access transmissions, an active signature detector, sometimes referred to as a signature decorrelator, can be used to detect an active resource unit's spreading signature. In some embodiments, spreading signatures are allocated to multiple resource units, meaning the active signature detector identifies a group of potentially active resource units. In embodiments where the pilot-to-transmit device mapping is known and the mapping is one-to-one or many pilots-to-one transmit device, active resource unit detection is equivalent to active transmit device detection. The active signature detector cannot perform active resource unit detection in systems using SCMA, as the SCMA codebook does not include signature data. Other techniques use a specialized random access sequence or signatures to detect an active resource unit or an active transmit device.

In random access transmission systems using SCMA, it is realized herein that active resource unit detection can be achieved by active pilot detection. Pilots are generally mapped via a predefined allocation or a random allocation. With a predefined allocation, the mapping is known. The mapping can be one-to-one, many resource units to one pilot, or many pilots to one resource unit. When the number of resource units is more than the number of pilots, then random access transmissions over two or more resource units with the same pilot active at the same time and frequency can conflict. In that case, additional information is used to identify the active resource unit and, in some cases, the active transmit device. Additional information useful for distinguishing conflicting transmissions includes payload header data or masked cyclic redundancy check (CRC). The active pilot detection narrows the set of potentially active resource units, and the additional information discriminates from the narrowed set. When the pilot-to-resource unit or pilot-to-transmit device mapping is one-to-one or many-to-one, the active pilot detection narrows the set of potentially active resource units or transmit devices without additional information. When the receiver has knowledge of all pilot-to-resource unit mappings and pilot-to-transmit device mappings, whether by some shared method or by some high-level signaling, the receiver can detect active transmit devices by detecting active pilots and associating them with their respective transmit devices.

With random allocation, a transmit device randomly picks a pilot and transmits. Two transmit devices can pick the same pilot and transmit at the same time and frequency, causing a conflict. When no conflict arises, active pilot detection can determine a list of active pilots. When the receiver has no knowledge or incomplete knowledge of pilot-to-transmit device mappings, the receiver can detect active pilots and use cyclic redundancy check (CRC) or packet header data to identify active transmit devices.

It is realized herein that active pilot detection can be accomplished using channel estimation. The receiver performs channel estimation for each channel between it and each of the potential transmit devices. The list of potentially active resource units is reduced by calculating the power for each of those channels and eliminating the resource unit associated with the channel having the least power. The procedure is then repeated to eliminate additional resource units from the potentially active resource units until the list of potentially active resource units reaches a threshold size. When the threshold is reached, those resource units remaining in the list of potentially active resource units are considered active resource units. The threshold can be configured to suit a particular wireless communication system's needs. For example, the threshold can be based on an average number of active resource units for the particular wireless communication system. This technique exploits the fact that inactive resource units have little to no power transmitted over their channels.

It is also realized herein that active pilot detection can be accomplished using compressive sensing techniques, which are sometimes referred to as compressed sensing techniques. Compressive sensing is a signal processing technique for reconstructing a signal in an underdetermined system by further constraining the system to be sparse. It is realized herein that the number of potential resource units is very large compared to the number of active resource units, meaning the problem of identifying active resource units is a sparse problem. The problem is formulated by defining a received pilot signal, b, as follows:

$$b = \sum_{C_1} A_k h_k + n = Ah + n$$

where $C_1$ is the set of indices for all potential pilots, $A_k$ is the pilot signal for the $k^{th}$ pilot in $C_1$, $h_k$ is the channel for the $k^{th}$ pilot in $C_1$, and n is noise. b is an aggregate received pilot signal from all channels. Additionally, A represents a vector containing pilots for all resource units corresponding to the indices in $C_1$, and h represents a vector containing the channels for all pilots in $C_1$. The goal is to determine a set of active pilots, $C_{active}$, through pilot detection. When the $k^{th}$ pilot is inactive, its channel, $h_k$, should be zero or nearly zero. Conversely, when the $k^{th}$ pilot is active, $h_k$ is non-zero. $C_{active}$ can be determined by locating non-zeros in h, thereby associating a non-zero, or active, channel to a pilot in A and an active resource unit. Ideal pilot detection has a low probability of missing an active pilot, produces the smallest $C_{active}$ possible, and is immune to varying channel conditions, which is sometimes referred to as being robust.

It is realized herein that active pilot detection can be accomplished using a focal underdetermined system solver (FOCUSS) technique, which is a form of compressive sensing. The FOCUSS technique iteratively solves the system b=Ah+n for h, given an initial value, $h_1$, for h. The initial value, $h_1$, can be computed using a least-squares estimation of h. For the $i^{th}$ iteration, the channel vector h is given by:

$$h_i = W_i W_i^H A^H (A W_i W_i^H A^H + \lambda_F I)^{-1} b,$$

where I is the identity matrix, $\lambda_F$ is a tuning parameter, and $W_i$ is given by $W_i = \text{diag}(h_{i-1})$. $\lambda_F$ may be optimized according to the given implementation, although it is typical to set $\lambda_F = 1$. The technique iterates $N_{FOCUSS}$ times before the procedure terminates, at which point each element in h is compared to a threshold $y_{FOCUSS}$. If the $k^{th}$ element, corresponding to the $k^{th}$ pilot, is larger than the threshold $y_{FOCUSS}$, then the $k^{th}$ pilot is considered active. $N_{FOCUSS}$ and $y_{FOCUSS}$ are configurable parameters for the FOCUSS technique. $N_{FOCUSS}$ can be selected according to the speed of convergence experienced for the system. $y_{FOCUSS}$ can be selected according to the residual channel power for inactive pilots, which can be small. For example, in one embodiment the number of iterations, $N_{FOCUSS}$, is 20 and threshold, $y_{FOCUSS}$, is 0.01. Additional details of the use of the FOCUSS technique to solve sparse systems can be found in "Sparse Signal Reconstruction from Limited Data Using FOCUSS: A Re-weighted Minimum Norm Algorithm," by Irina F. Gorodnitskey and Bhaskar D. Rao, IEEE Trans. Signal Processing, 1997, which is hereby incorporated herein by reference.

It is also realized herein that active pilot detection can be accomplished using an expectation-maximization (EM) technique, which is another form of compressive sensing. The EM technique includes an expectation step followed by a maximization step. The EM technique also iteratively solves the system b=Ah+n for h, given an initial value, $h_1$, for h. The initial value, $h_1$, can be computed using a least-squares estimation of h. For the $i^{th}$ iteration, the channel vector h is given by:

$$h_i = \text{sgn}(b_i) \cdot (|b_i| - c_1 c_2 (1-\Delta))_+,$$

and $$b_i = (I - c_1 A^H A) \cdot h_{i-1} + c_1 A^H b,$$

where $c_1$ is a configurable parameter, $c_2$ is a configurable parameter, $\Delta$ is a vector of a posteriori probabilities that each pilot is active, and $b_i$ is a re-computation of the received aggregate signal for the $i^{th}$ iteration. Configurable parameters $c_1$ and $c_2$ can be optimized for a given application. $c_1$ is related to the largest eigenvalue, s, of $A \cdot A^H \cdot c_1$ should be less than $1/s \cdot c_2$ can be determined heuristically with $c_1$ to yield the best performance. For example, $c_1$ and $c_2$ can be determined via a simulation. In one embodiment, $c_1 = 0.005/s$ and $c_2 = 15$. $\Delta$ can be determined according to historical information regarding the probability a given pilot is active. If no probabilistic information is available, each of the potential pilots is equally likely to be active, so the elements of $\Delta$ are equal. $b_i$ is computed at each iteration, strengthening those pilots that appear active and weakening those that appear inactive. The technique iterates $N_{EM}$ times before the procedure terminates, at which point each element in h is compared to a threshold $y_{EM}$. If the $k^{th}$ element, corresponding to the $k^{th}$ pilot, is larger than the threshold $y_{EM}$, then the $k^{th}$ pilot is considered active. $N_{EM}$ and $y_{EM}$ are configurable parameters for the EM technique. $N_{EM}$ can be selected according to the speed of convergence experienced for the system. $Y_{EM}$ can be selected according to the residual channel power for inactive pilots, which can be very small. For example, in one embodiment the number of iterations, $N_{EM}$, is 150 and threshold, $y_{FOCUSS}$, is 0.02. Additional details of the use of the EM technique to solve sparse systems can be found in "Maximum Likelihood from Incomplete Data via the EM Algorithm," by A. P. Dempster, et al., Journal of the Royal Statistical Society, Series B (Methodological), Vol. 39, No. 1, 1977, which is hereby incorporated herein by reference.

Additionally, it is realized herein, the channel estimation and compressive sensing techniques described above can be used alone or in combination to achieve a desired level of inclusion, exclusion, and robustness.

FIG. 1 is a block diagram of one embodiment of a wireless communication system 100. Wireless communication system 100 includes a base station 110 within which the active resource unit detection introduced herein may be embodied. Base station 110 serves one or more transmit devices, such as UE 120, UE 130, UE 140, and UE 150, by receiving random access UL communications originating from the transmit devices and forwarding the communications to their respective intended destinations, or by receiving communications destined for the transmit devices and forwarding the communications to their respective intended transmit devices. Some transmit devices can communicate directly with one another as opposed to communicating through base station 110. For example, in the embodiment of FIG. 1, a UE 160 transmits directly to UE 150, and vice versa. Base station 910 is sometimes referred to as an access point, a NodeB, an evolved NodeB (eNB), a controller, a transmit device, or a communication controller. UEs 120 through 160 are sometimes referred to as stations, mobile stations, mobiles, terminals, users, transmit devices, or subscribers. Base station 110 is configured to use active resource unit detection to determine which of UEs 120, 130, 140, 150, and 160 are transmitting UL communications at a given time.

Figure 2:
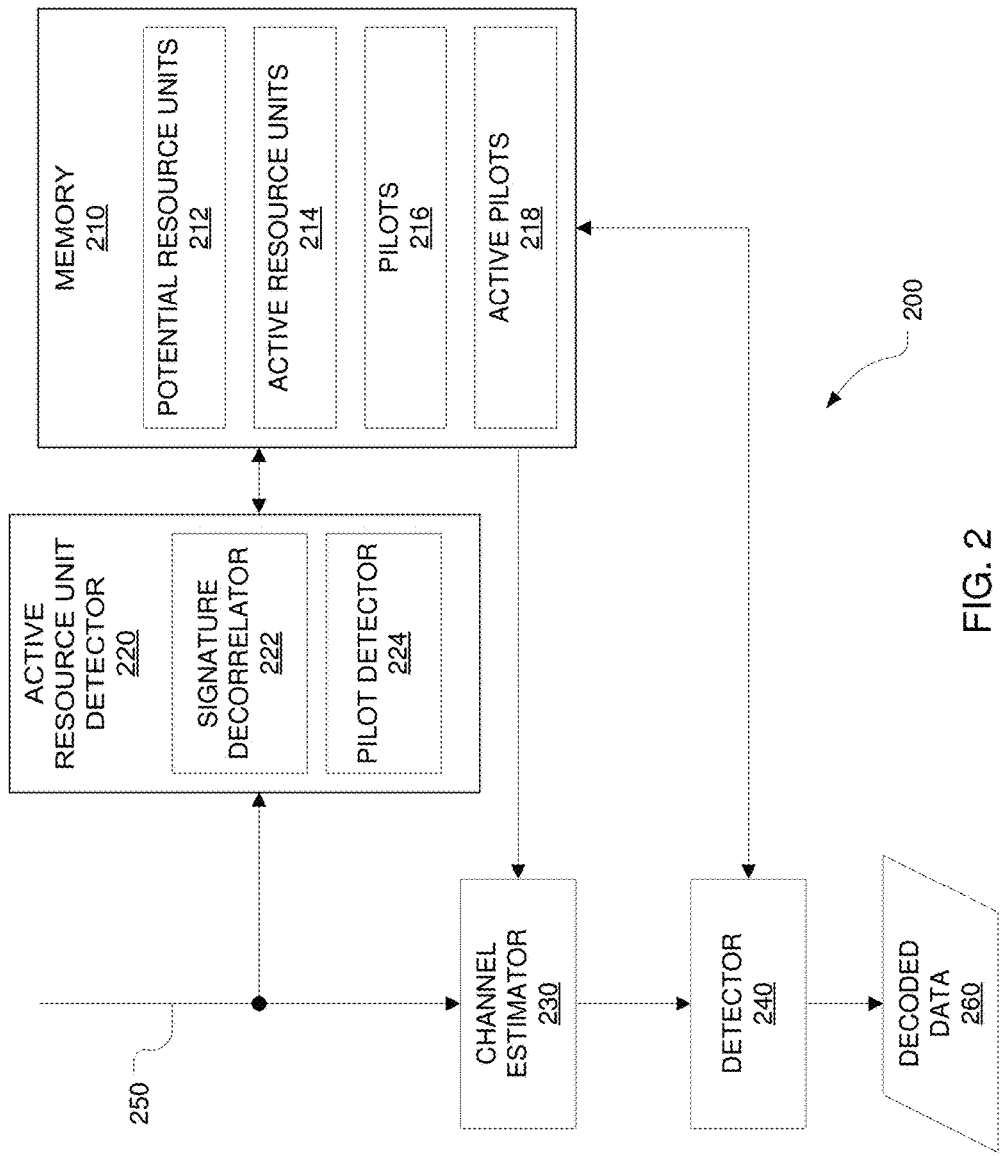
FIG. 2 is a block diagram of one embodiment of a receiver for active resource unit detection.

FIG. 2 is a block diagram of one embodiment of a receiver 200 for active resource unit detection in random access transmission systems. Receiver 200 includes a memory 210, an active resource unit detector 220, a channel estimator 230, and a detector 240. A received aggregate pilot signal 250 is an input to receiver 200 and decoded data 260 is an output.

Memory 210 can be any type of storage medium, including random access memory (RAM), flash, and hard disk, among others. Additionally, memory 210 can be volatile or non-volatile. Memory 210 is configured to store a list of potential resource units 212, a list of active resource units 214, pilots 216, and active pilots 218. The list of potential resource units 212 includes all resource units known to be allocated by receiver 200, which includes both active and inactive resource units. The list of active resource units 214 includes all resource units determined to be actively communicating with receiver 200 and is a subset of potential resource units 212. In a random access transmission system, the identities of active resource units 214 are determined by active resource unit detector 220. Pilots 216 include respective pilots of potential resource units 212. Each pilot in pilots 216 effectively identifies one or more corresponding resource units. Each of potential resource units 212 can have one or more corresponding pilots in pilots 216. Active pilots 218 form a subset of pilots 216 and include all pilots determined to have been received by receiver 200 from active resource units 214. Like active resource units 214, in random access transmission systems the identities of active pilots 218 are unknown to receiver 200 and are determined by active resource unit detector 220.

Active resource unit detector 220 is coupled to memory 210 by a bus through which active resource unit detector may access memory 210, including the list of potential resource units 212 and pilots 216. Active resource unit detector 220 receives received aggregate pilot signal 250 as an input and identifies the list of active resource units 214 among potential resource units 212. Active resource unit detector 220 includes a signature decorrelator 222 and a pilot detector 224. Signature decorrelator 222 is operable when the random access transmissions use an LDS signature. The LDS signature includes a spreading signature that signature decorrelator 222 is configured to detect and associate with a specific resource unit of potential resource units 212. Signature decorrelator 222 operates in sequence with pilot detector 224 to narrow the list of active resource units 214 among potential resource units 212. Pilot detector 224 detects active pilots 218 among pilots 216 in received aggregate pilot signal 250. Active pilots 218 are then associated with respective active resource units 214.

Pilot detector 224 can use a variety of techniques for identifying active pilots 218 among pilots 216 in received aggregate pilot signal 250. In certain embodiments, where pilot detector 224 is coupled to channel estimator 230, pilot detector 224 is configured to use channel estimations from channel estimator 230 to determine which channels have low power. Pilot detector 224 iteratively uses the channel estimations to reduce the list of active resource units 214 by resource units corresponding to lowest power channels for each iteration. The channel estimation technique iterates until the number of active resource units 214 reaches a threshold. The threshold can be determined, for example, according to historical data about the number of active resource units over time.

In alternative embodiments, given the expectation that the list of active resource units 214 is small relative to the list of potential resource units 212, techniques for solving sparse systems can be applied to determine the list of active resource units 214 among potential resource units 212. One type of technique for solving sparse systems is compressive sensing, which is to reconstruct a signal in an underdetermined system by further constraining the system to be sparse. Two compressive sensing techniques that can be used to determine the list of active resource units 214 are the FOCUSS technique and the EM technique. The compressive sensing techniques are applied by constructing a sparse system using pilots 216 and received aggregate pilot signal 250; the system is shown below.

$$b = \sum_{C_1} A_k h_k + n = Ah + n$$

In the system above, b represents received aggregate pilot signal 250, which is set equal to a sum of products of pilots 216, A, and their respective channels, h. The set of potential resource units 212 is represented by $C_1$, over which the sum is made. For example, consider a $k^{th}$ pilot, $A_k$, in pilots 216, A, associated with a $k^{th}$ channel, $h_k$, and a $k^{th}$ resource unit in potential resource units 212, $C_1$; the portion of received aggregate pilot signal 250, b, attributable to the $k^{th}$ resource unit is approximated by the product $A_k h_k$.

In embodiments of pilot detector 224 using the FOCUSS technique, pilot detector 224 computes h for $N_{FOCUSS}$ iterations using the previously-described FOCUSS technique formula. After the last iteration, the elements of h exceeding a threshold, $y_{FOCUSS}$, are considered active channels. The active channels respectively correspond to active pilots 218 and active resource units 214.

Similarly, in embodiments of pilot detector 224 using the EM technique, pilot detector 224 computes b and h for $N_{EM}$ iterations using the previously-described EM technique formula. After the last iteration, the elements of h exceeding a threshold, $y_{EM}$, are considered active channels. The active channels respectively correspond to active pilots 218 and active resource units 214.

Channel estimator 230 is also coupled to memory 210 and is configured to access the list of active resource units 214 and receive received aggregate pilot signal 250. Given the list of active resource units 214, channel estimator 230 generates channel estimates for the corresponding active channels. Detector 240 is coupled to channel estimator 230 and memory 210. Detector 240 uses the list of active resource units 214 from memory 210 and the channel estimations from channel estimator 230 to detect and decode received aggregate pilot signal 250, thereby yielding decoded data 260.

Active resource unit detector 220, channel estimator 230, and detector 240 can be implemented in one or more processors, one or more application specific integrated circuits (ASICs), one or more field-programmable gate arrays (FPGAs), dedicated logic circuitry, or any combination thereof, all collectively referred to as a processor. The respective functions for active resource unit detector 220, channel estimator 230, and detector 240 can be stored as instructions in non-transitory memory for execution by the processor.

In embodiments where the pilot-to-resource unit mapping is one-to-one or many-to-one, active resource unit detector 220 can associate active pilots with active resource units as described in the paragraphs above. In embodiments where the pilot-to-resource unit mapping is one-to-many, as in systems where one pilot maps to multiple resource units, once active pilots are detected, active resource unit detector 220 is configured to use data from the packet header or masked CRC to identify a particular resource unit. Data detection and decoding follow from there.

Figure 3:
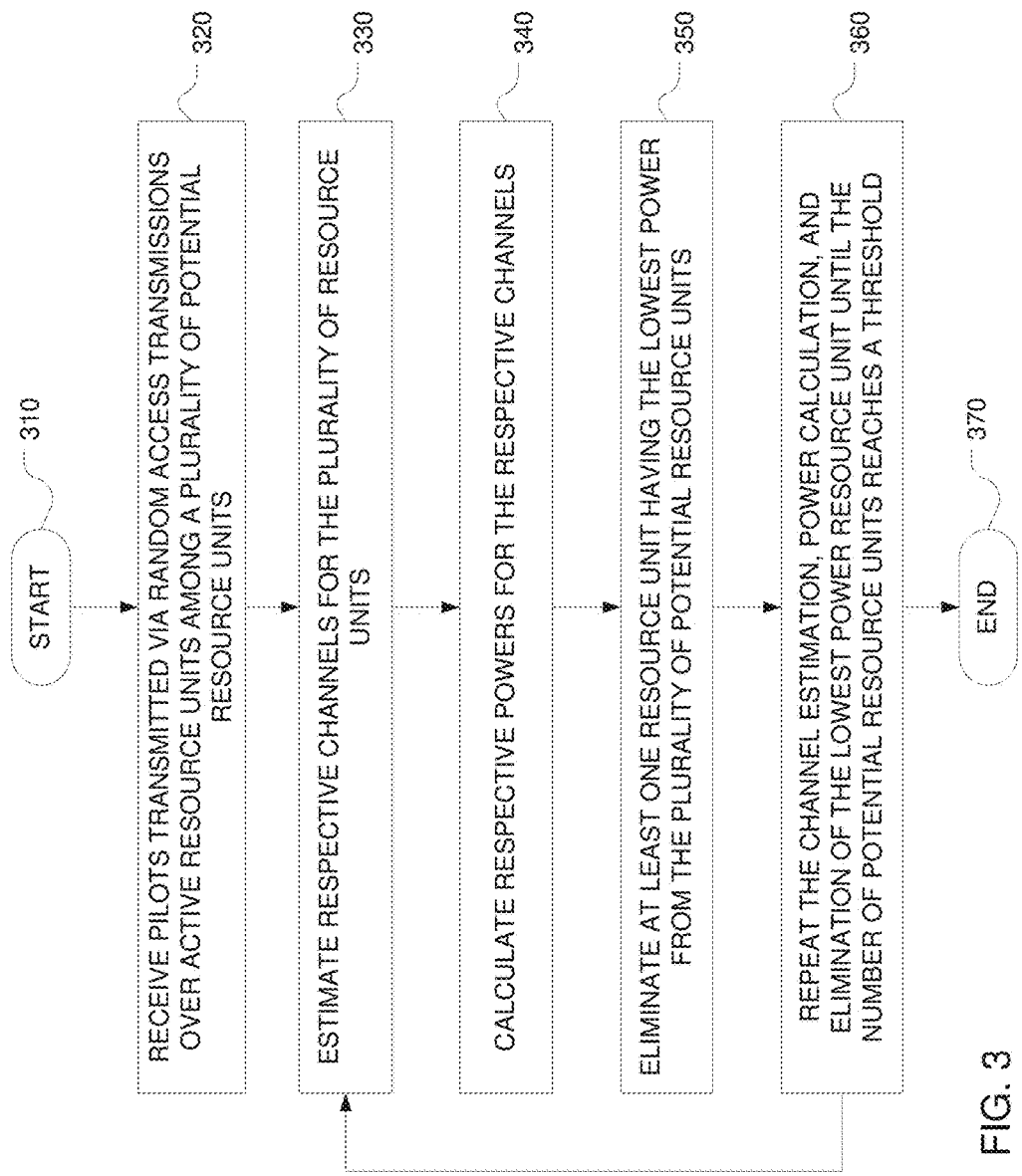
FIG. 3 is a flow diagram of one embodiment of a method of blind active resource unit detection using channel estimation.

FIG. 3 is a flow diagram of one embodiment of a method of detecting active resource units in a random access transmission system. The method begins at a start step 310. At a receiving step 320, pilots are received over active resource units among a plurality of potential resource units. The pilots are transmitted via a random access transmissions. The pilots are received as an aggregate pilot signal, which is a sum of pilot signals transmitted over all respective channels for the plurality of potential resource units. At a channel estimation step 330, the respective channels for the plurality of potential resource units are estimated, and the powers are calculated at a power calculation step 340. Initially, each of the plurality of potential resource units is possibly active. At an elimination step 350, at least one resource unit of the plurality of potential resource units corresponding to the lowest power channel is removed from the plurality of resource units that are possibly active. In alternative embodiments, at elimination step 350, resource units corresponding to channel powers below a threshold are eliminated from the plurality of resource units that are possibly active. The threshold can be a fixed threshold or can be dynamically controlled according to the distribution of power for the current pilots. Alternatively, the threshold can be determined according to detection history.

At a repeat step 360, channel estimation step 330, power calculation step 340, and elimination step 350 are repeated until the number of potential resource units reaches a threshold. Once the threshold is reached, the remaining resource units of the plurality of potential resource units are considered active. The method then ends at an end step 370.

Figure 4:
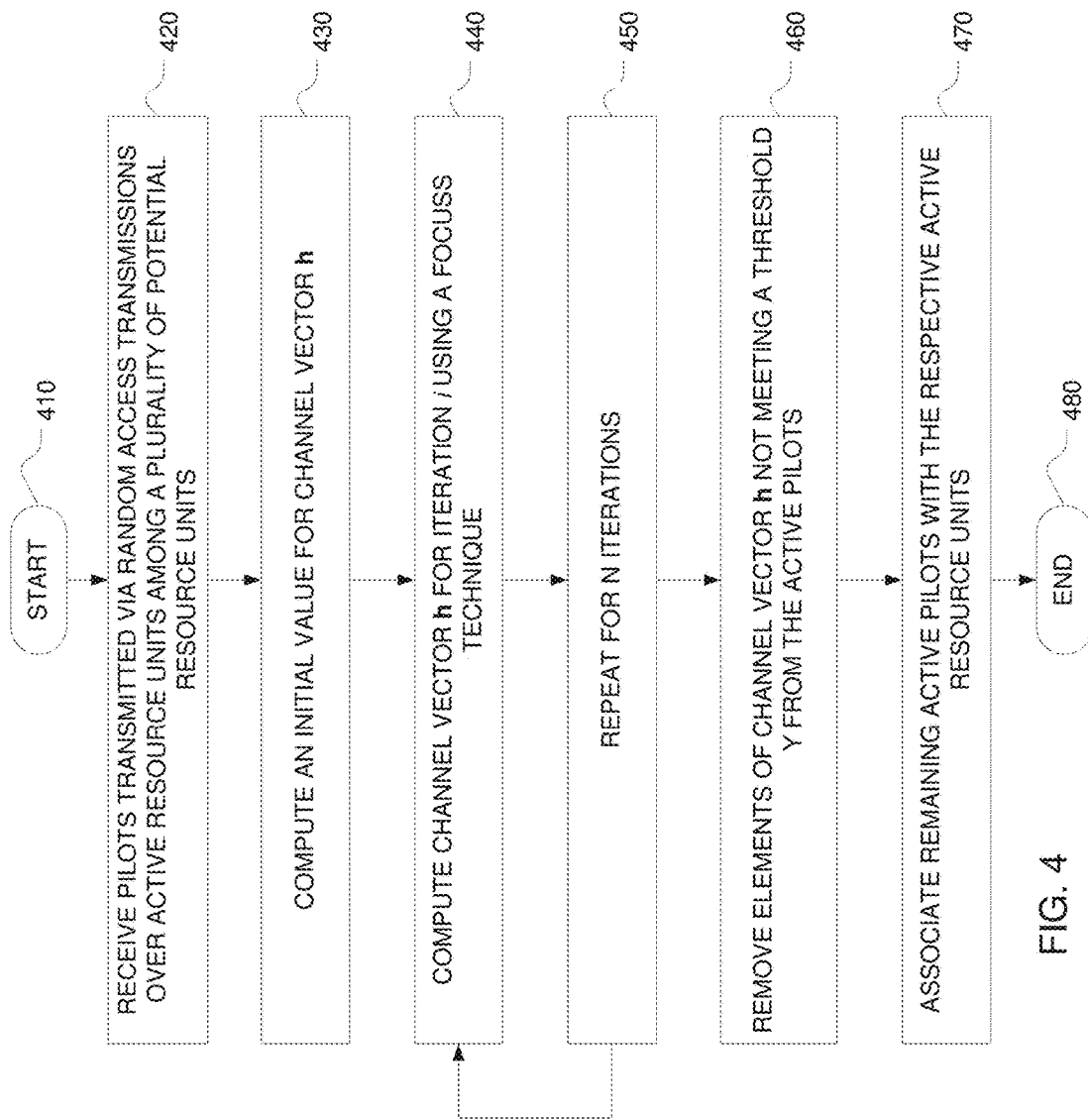
FIG. 4 is a flow diagram of another embodiment of a method of blind active pilot detection using a focal underdetermined system solver (FOCUSS) compressive sensing technique.

FIG. 4 is a flow diagram of another embodiment of a method of detecting active resource units in a random access transmission system. The method begins at a start step 410. At a receiving step 420, pilots are received over active resource units among a plurality of potential resource units. The pilots are transmitted via a random access transmission. The pilots are received as an aggregate pilot signal, which is an aggregate of pilots transmitted over all respective channels for the plurality of potential resource units.

At an initial value computation step 430, an initial value for a channel vector, h, is computed as a function of a pilot vector, A, and the aggregate pilot signal, b. The pilot vector, A, contains respective pilots for each of the plurality of potential resource units. In certain embodiments, the initial value is computed via a least-squares technique. Given the initial value for the channel vector, the channel vector can be recomputed for each iteration at a channel vector compute step 440 using the FOCUSS technique. Channel vector compute step 440 is then repeated at repeat step 450 for N iterations. The number of iterations, N, is adjustable to allow tuning to a specific random access transmission system according to timing requirements and acceptable levels of over- and under-inclusion. After N iterations, at a narrowing step 460, pilots corresponding to elements of the channel vector that do not meet a threshold, Y, are removed from the active pilots, thus narrowing the number of active resource units. The remaining active pilots are then associated with respective active resource units at an association step 470. The method ends at an end step 480.

Figure 5:
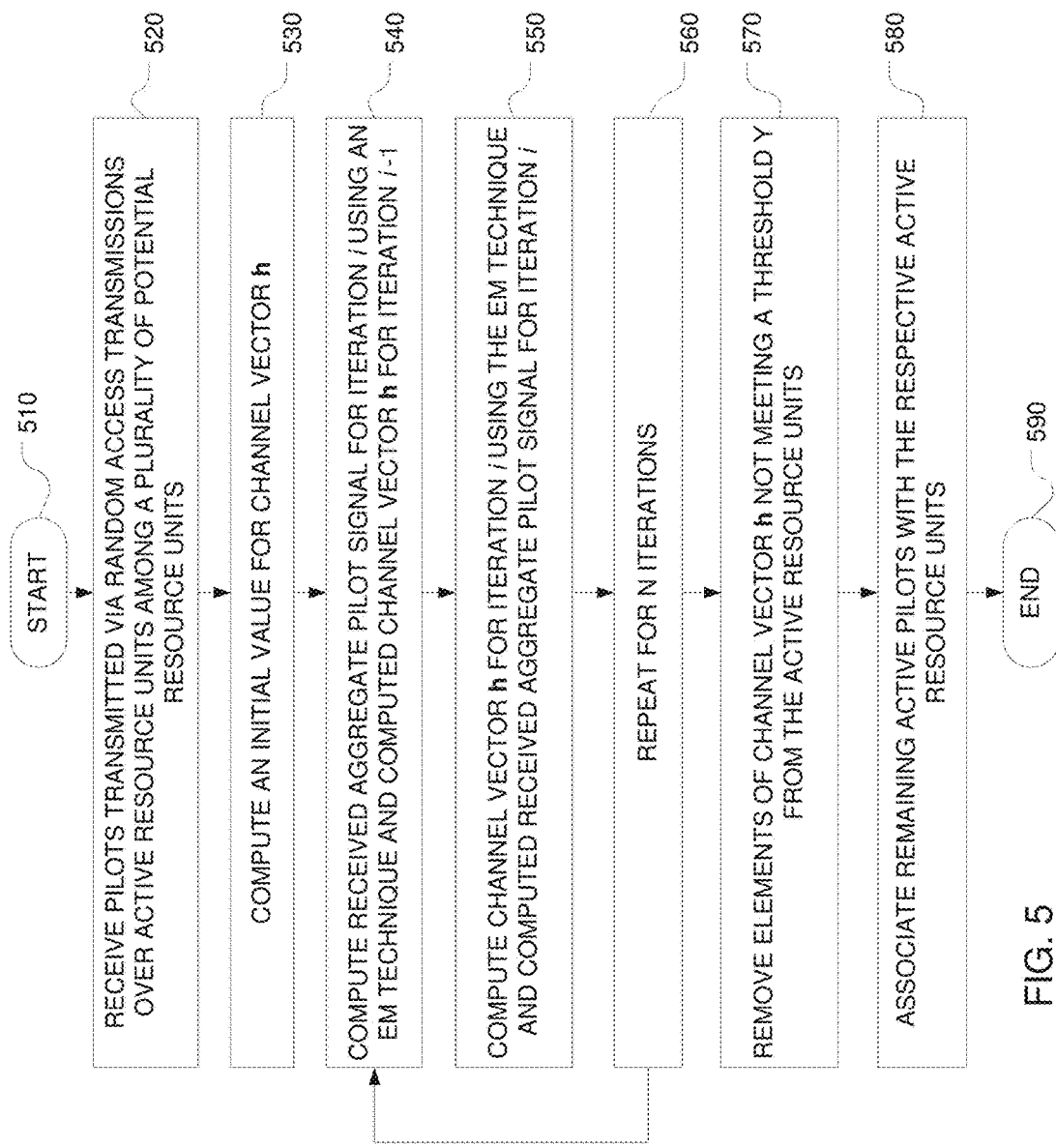
FIG. 5 is a flow diagram of yet another embodiment of a method of blind active pilot detection using an expectation-maximization (EM) compressive sensing technique.

FIG. 5 is a flow diagram of yet another embodiment of a method of detecting active resource units in a random access transmission system. The method begins at a start step 510. At a receiving step 520 pilots are received over active resource units among a plurality of potential resource units. The pilots are transmitted via a random access transmission. The pilots are received as an aggregate pilot signal, which is an aggregate of pilots transmitted over all respective channels for the plurality of potential resource units.

At an initial value computation step 530, an initial value for a channel vector, h, is computed as a function of a pilot vector, A, and the aggregate pilot signal, b. The pilot vector, A, contains respective pilots for each of the plurality of potential resource units. In certain embodiments, the initial value is computed via a least-squares technique. Given the initial value for the channel vector and the initial aggregate pilot signal, the aggregate pilot signal is computed for each iteration using the EM technique at an aggregate pilot signal compute step 540. At a channel vector compute step 550, the computed aggregate pilot signal from aggregate pilot signal compute step 540 is used to recompute the channel vector for each iteration. Aggregate pilot signal compute step 540 and channel vector compute step 550 are then repeated for N iterations at a repeat step 560. After N iterations, at a narrowing step 570, pilots corresponding to elements of the channel vector that do not meet a threshold, Y, are removed from the active pilots, thus narrowing the number of active resource units. The remaining active pilots are then associated with respective active resource units at an association step 580. The method then ends at an end step 590.

Figure 6:
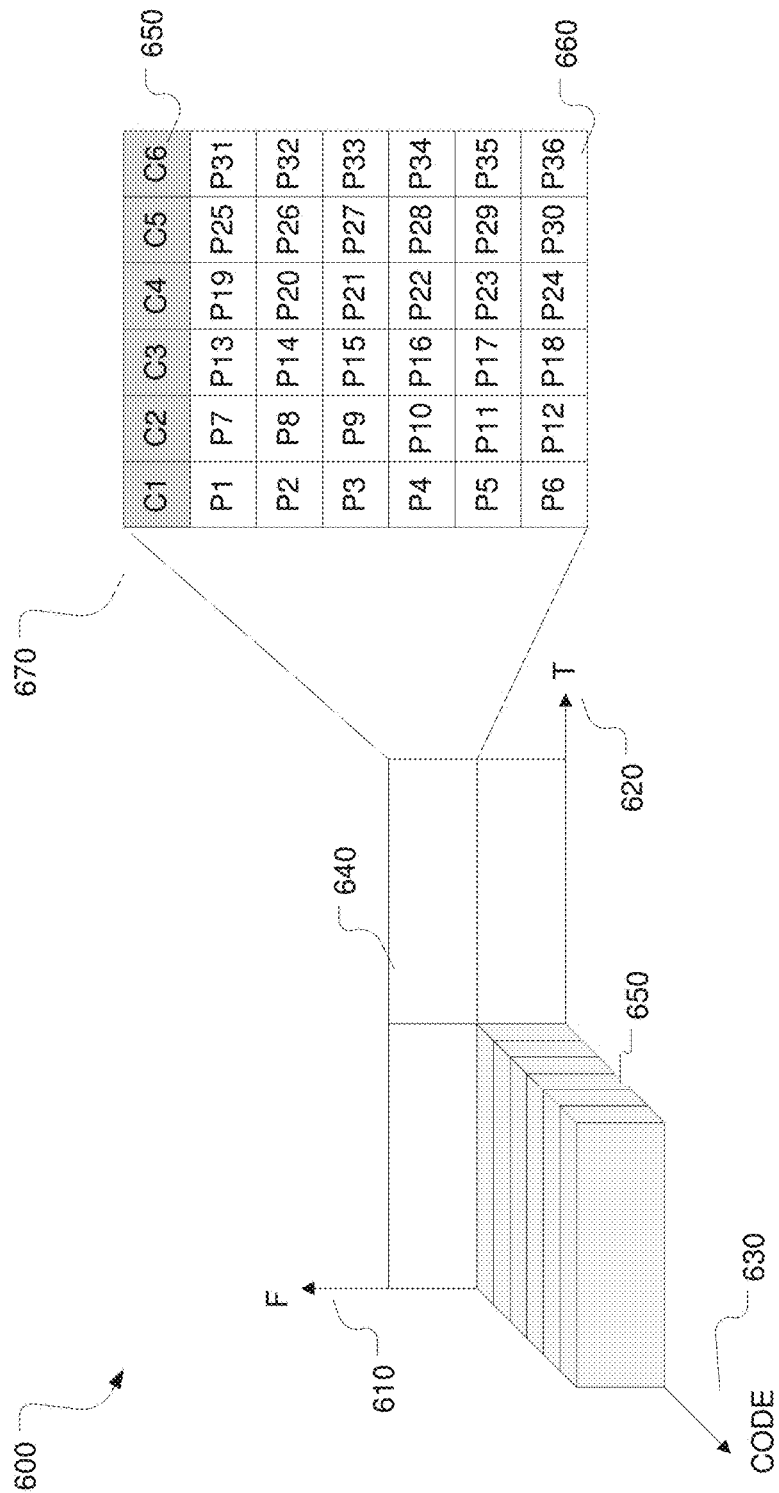
FIG. 6 is a diagram illustrating one embodiment of resource allocation.

FIG. 6 is a diagram illustrating one embodiment of a resource allocation 600. In resource allocation 600, resources are allocated in four dimensions. The first two dimensions are a frequency dimension 610 and a time dimension 620. Time and frequency resources are divided into regions in the time-frequency plane. For example, the regions in the time-frequency plane include a time-frequency region 640. A third dimension in resource allocation 600 is a code dimension 630. In code dimension 630, a time-frequency region is divided into unique codes 650. The type of codes used can vary per embodiment. For example, in an embodiment using SCMA, unique codes 650 represent the various codebooks used in SCMA. In alternative embodiments, such as embodiments using LDS or CDMA, unique codes 650 represent unique spreading signatures used in LDS and CDMA. Resource allocation 600 is further divided in a fourth dimension, a pilot dimension. The pilot dimension is illustrated by an expansion 670 of time-frequency region 640. Expansion 670 illustrates pilots 660 allocated among unique codes 650. Each of pilots 660 represents a resource unit. A resource unit is an allocation, generally to users, of time, frequency, code, and pilot combination in a communication system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of detecting resource units in a random access transmission system, the method comprising:
    receiving an aggregate signal containing a sum of active pilots transmitted over a shared time-frequency resource via random access transmissions by active user equipments;
    detecting the active pilots from the received aggregate signal; and
    respectively associating the active pilots with the resource units according to a pilot-to-resource unit mapping.

2. The method of claim 1, wherein the resource units comprise sparse code multiple access (SCMA) codebooks.

3. The method of claim 1, further comprising generating a list of the resource units according to the pilot-to-resource unit mapping.

4. The method of claim 1, further comprising respectively associating the active pilots with the active user equipments according to a pilot-to-user equipment mapping.

5. The method of claim 1, wherein the pilot-to-resource unit mapping includes a mapping of one pilot of the active pilots to more than one of the resource units, and wherein the respectively associating the active pilots with the resource units further comprises associating the one pilot according to a masked cyclic redundancy check (CRC) for a corresponding resource unit.

6. The method of claim 1, wherein the pilot-to-resource unit mapping includes a mapping of one pilot of the active pilots to more than one of the resource units, and wherein the respectively associating the active pilots with the resource units further comprises associating the one pilot according to payload header information for a corresponding resource unit.

7. The method of claim 1, wherein the pilot-to-resource unit mapping includes a mapping of each of the active pilots to only one of the resource units.

8. The method of claim 1, wherein the detecting the active pilots comprises:
estimating respective channels for a plurality of potential pilots respectively corresponding to a plurality of potential resource units;
calculating respective powers for the respective channels, the plurality of potential pilots including at least one lowest-power pilot;
eliminating the at least one lowest-power pilot from a plurality of potentially active pilots; and
repeating the estimating, the calculating, and the eliminating until a count of the plurality of potentially active pilots reaches a threshold.

9. The method of claim 1, wherein the detecting the active pilots includes solving a system formed by the aggregate signal, the active pilots transmitted by the active user equipments, and respective channels for a plurality of potential resource units using a compressive sensing technique.

10. The method of claim 9, wherein the compressive sensing technique comprises an expectation-maximization (EM) technique.

11. The method of claim 9, wherein the compressive sensing technique comprises a focal underdetermined system solver (FOCUSS) technique.

12. A communications controller for detecting resource units in a random access transmission system, the communications controller comprising:
a receiver configured to receive an aggregate signal containing a sum of active pilots transmitted over a shared time-frequency resource via random access transmissions by active user equipments;
a non-transitory memory storage comprising instructions; and
one or more processors in communication with the receiver and the memory storage, wherein the one or more processors execute the instructions to:
detect the active pilots from the received aggregate signal; and
respectively associate the active pilots with the resource units according to a pilot-to-resource unit mapping.

13. The communications controller of claim 12, wherein the resource units comprise sparse code multiple access (SCMA) codebooks.

14. The communications controller of claim 12, wherein the one or more processors further execute the instructions to generate a list of the resource units according to the pilot-to-resource unit mapping.

15. The communications controller of claim 12, wherein the one or more processors execute the instructions to respectively associate the active pilots with the active user equipments according to a pilot-to-user equipment mapping.

16. The communications controller of claim 12, wherein the pilot-to-resource unit mapping includes a mapping of one pilot of the active pilots to more than one of the resource units, and wherein the one or more processors executing the instructions to respectively associate the active pilots with the resource units comprises the one or more processors executing the instructions to associate the one pilot according to a masked cyclic redundancy check (CRC) for a corresponding resource unit.

17. The communications controller of claim 12, wherein the pilot-to-resource unit mapping includes a mapping of one pilot of the active pilots to more than one of the resource units, and wherein the one or more processors executing the instructions to respectively associate the active pilots with the resource units comprises the one or more processors executing the instructions to associate the one pilot according to payload header information for a corresponding resource unit.

18. The communications controller of claim 12, wherein the pilot-to-resource unit mapping includes a mapping of each of the active pilots to only one of the resource units.

19. The communications controller of claim 12, wherein the one or more processors executing the instructions to detect the active pilots comprises the one or more processors executing the instructions to:
estimate respective channels for a plurality of potential pilots respectively corresponding to a plurality of potential resource units;
calculate respective powers for the respective channels, the plurality of potential pilots including at least one lowest-power pilot;
eliminate the at least one lowest-power pilot from a plurality of potentially active pilots; and
repeat the estimating, the calculating, and the eliminating until a count of the plurality of potentially active pilots reaches a threshold.

20. The communications controller of claim 12, wherein the one or more processors executing the instructions to detect the active pilots comprises the one or more processors executing the instructions to solve a system formed by the aggregate signal, the active pilots transmitted by the active user equipments, and respective channels for a plurality of potential resource units using a compressive sensing technique.

21. The communications controller of claim 20, wherein the compressive sensing technique comprises an expectation-maximization (EM) technique.

22. The communications controller of claim 20, wherein the compressive sensing technique comprises a focal underdetermined system solver (FOCUSS) technique.

23. The communications controller of claim 12, wherein the resource units comprise code domain spreading signatures.

24. The communications controller of claim 23, wherein the code domain spreading signatures comprise low-density signature (LDS) signatures.

25. The method of claim 1, wherein the resource units comprise code domain spreading signatures.

26. The method of claim 25, wherein the code domain spreading signatures comprise low-density signature (LDS) signatures.

* * * * *